United States Patent [19]
Totaro et al.

[11] Patent Number: 6,137,885
[45] Date of Patent: Oct. 24, 2000

[54] METHOD FOR ENABLING DIRECT ENCRYPTED COMMUNICATION BETWEEN TWO TERMINALS OF A MOBILE RADIO NETWORK, AND CORRESPONDING STATION AND TERMINAL FACILITIES

[75] Inventors: Antoine Totaro, Muret; Erick Flores, Toulouse, both of France

[73] Assignee: Alcatel, Paris, France

[21] Appl. No.: 09/081,550

[22] Filed: May 20, 1998

[30] Foreign Application Priority Data

May 21, 1997 [FR] France .................................. 97 06180

[51] Int. Cl.[7] ...................................................... H04K 1/00
[52] U.S. Cl. .......................... 380/247; 380/248; 380/249; 380/259; 380/270; 380/273; 380/283; 380/44; 455/410; 455/411
[58] Field of Search .................................... 380/247, 248, 380/249, 259, 270, 273, 283, 44; 455/410, 411

[56] References Cited

U.S. PATENT DOCUMENTS

| | | | |
|---|---|---|---|
| 4,633,037 | 12/1986 | Serpell ................................ | 178/22.14 |
| 5,016,276 | 5/1991 | Matumoto et al. ...................... | 380/45 |
| 5,091,942 | 2/1992 | Dent ....................................... | 380/46 |
| 5,172,414 | 12/1992 | Reeds, III et al. ..................... | 380/45 |
| 5,227,613 | 7/1993 | Takagi et al. ........................... | 235/380 |
| 5,325,432 | 6/1994 | Gardeck et al. ......................... | 380/21 |
| 5,402,491 | 3/1995 | Losascio et al. ........................ | 380/21 |
| 5,420,577 | 5/1995 | Kim et al. ........................... | 340/825.52 |
| 5,455,863 | 10/1995 | Brown et al. ............................ | 380/23 |
| 5,467,398 | 11/1995 | Pierce et al. ............................ | 380/44 |
| 5,528,691 | 6/1996 | Rosauer et al. ......................... | 380/21 |
| 5,548,631 | 8/1996 | Krebs et al. ............................. | 379/58 |
| 5,602,915 | 2/1997 | Campana et al. ....................... | 380/21 |
| 5,604,807 | 2/1997 | Yamaguchi et al. .................... | 380/48 |
| 5,661,806 | 8/1997 | Nevoux et al. .......................... | 380/25 |
| 5,809,140 | 9/1998 | Rubin et al. ............................. | 380/21 |
| 5,889,861 | 3/1999 | Ohashi et al. ........................... | 380/21 |
| 5,923,759 | 7/1999 | Lee .......................................... | 380/25 |
| 5,960,086 | 9/1999 | Atalla ...................................... | 380/44 |
| 5,966,449 | 10/1999 | Iwamura et al. ........................ | 380/44 |
| 5,991,405 | 11/1999 | Mills ....................................... | 380/21 |
| 5,991,407 | 11/1999 | Murto ...................................... | 380/23 |

FOREIGN PATENT DOCUMENTS

WO9523467  8/1995  WIPO .

*Primary Examiner*—Tod R. Swann
*Assistant Examiner*—Paul E. Callahan
*Attorney, Agent, or Firm*—Sughrue, Mion, Zinn Macpeak & Seas, PLLC

[57] ABSTRACT

A method for enabling encrypted communication to be performed directly in a single hop or merely directly between two terminals of a mobile radio network by satellite and/or of the GSM/DCS type, after one of said terminals has called via a fixed radio station of the network. After a first encryption stage, performed in conventional manner, a cipher key is simultaneously generated by the identity card associated with the calling terminal and by the network control structure for encrypting/decrypting data transmitted over the radio link between said calling terminal and the station. This cipher key is then stored in a memory of the station so as to be transmitted to the called terminal when a radio link is set up between said station and said called terminal for the call requested by the calling terminal, and the key is used for the purpose of encrypting/decrypting the data interchanged between the calling and called terminals.

10 Claims, 3 Drawing Sheets

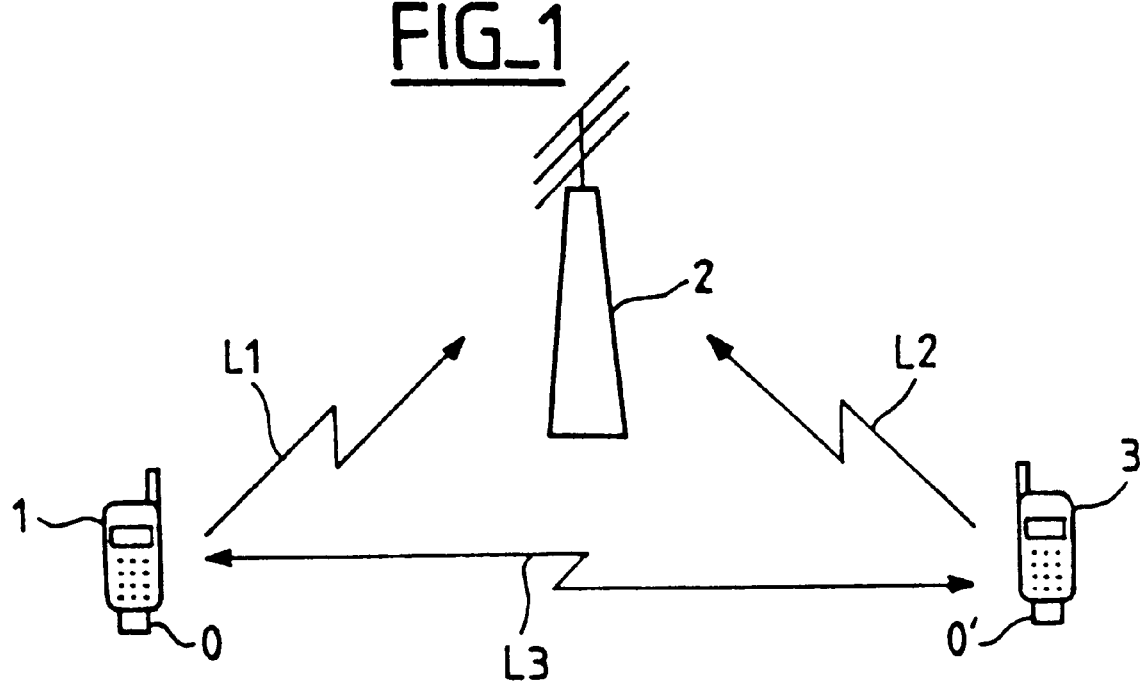

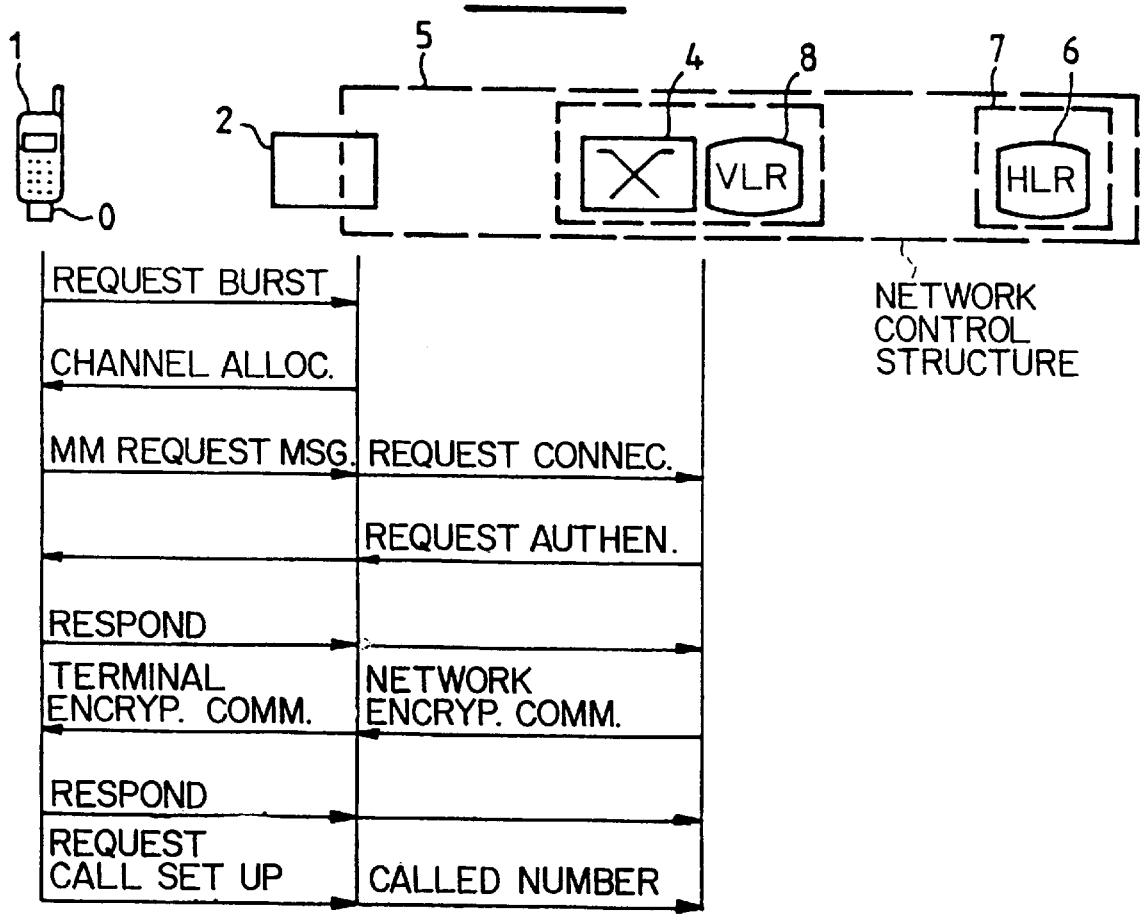

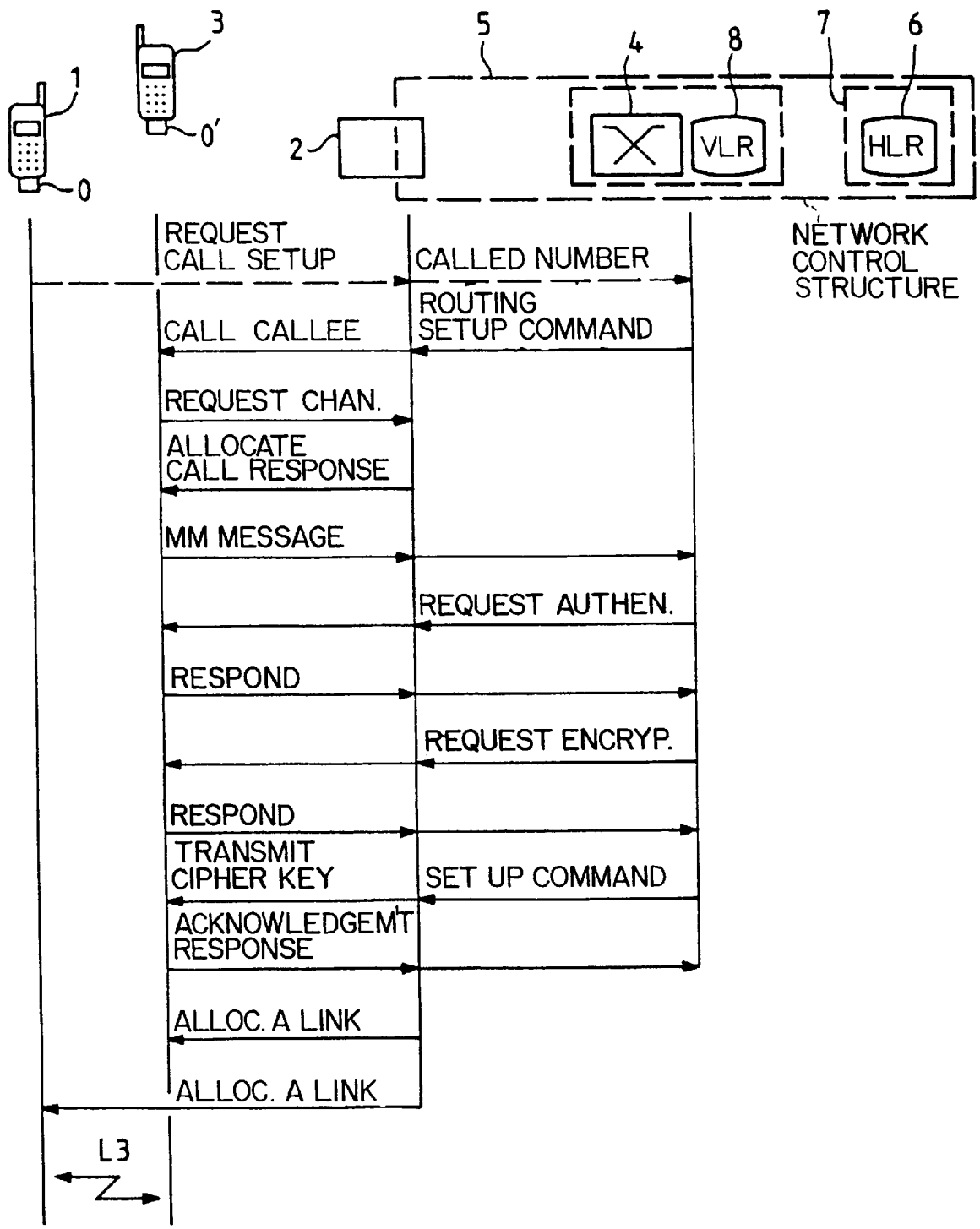

METHOD FOR ENABLING DIRECT ENCRYPTED COMMUNICATION BETWEEN TWO TERMINALS OF A MOBILE RADIO NETWORK, AND CORRESPONDING STATION AND TERMINAL FACILITIES

The invention relates to a method for enabling direct encrypted communication between two terminals of a mobile radio network of the GSM/DCS type and/or by satellite. The invention also relates to corresponding mobile radio station and terminal facilities.

BACKGROUND OF THE INVENTION

Communication between two mobile radio terminals, and in particular between terminals of a GSM type network, is conventionally set up via at least one fixed radio station serving as a gateway, which station can optionally be the same for two terminals if both of them are within appropriate radio range of that station. Under such circumstances, managing radio resources and processing encryption and decryption are performed by the station serving both terminals. One radio link is established between the calling terminal and the common station, and another radio link is established between said station and the called terminal. Encryption is performed using a cipher key, referred to herein as Kc1 on the first-mentioned of said links, and using a cipher key, referenced herein as Kc2, on the second link.

An authentication procedure is provided for each of the two terminals via the station which is then common to them. To this end, the station transmits a different random number RAND to each terminal. The subscriber identification card, e.g. a SIM card, inserted in a terminal makes use of the number RAND received by the terminal to calculate a signal response number SRES, with the help of an individual secret authentication key Ki and a shared authentication algorithm A3 which it stores together with the key Ki. The signed response SRES supplied by the card is transmitted by the terminal including the card and enables the assembly constituted by the terminal plus the card to be identified by the mobile radio network. This identification is achieved if the transmitted signed response SRES corresponds to the signed response SRES simultaneously calculated from the same number RAND in the mobile radio network. The card inserted in a terminal also makes use of the number RAND that the terminal has received and of the key Ki that it stores for the purpose of calculating the cipher key Kc, i.e. Kc1 or Kc2 in this case, by means of a shared algorithm A8 for key-determining purposes, that it also stores. Each cipher key produced by a card is designed to be used together with a shared ciphering algorithm A5 to encrypt the data transmitted by the terminal which includes the card and to decrypt the data received by said terminal from the station with which it is in communication.

However, it is not possible at present to have direct encrypted communication between two terminals of the GSM/DCT mobile radio network that are situated within appropriate radio range of each other without passing via a station, since each of the two terminals uses a different cipher key Kc1 or Kc2, so neither of them can decrypt the transmissions of the other.

Similarly, in a mobile radio network where calls are established under the supervision of a controlling ground station and where they pass via one or possibly more satellites between the mobile radio terminals, it is not possible at present to have direct encrypted communication between terminals in a single hop via one or more satellites, for the reason given above.

OBJECTS AND SUMMARY OF THE INVENTION

The invention therefore proposes a method for enabling encrypted communication to take place directly in a single hop or merely directly, depending on the network, between two terminals of a mobile radio network by satellite and/or of the GSM/DCS type, after a call has been set up by one of the terminals via one of the fixed radio stations of the network in order to establish direct or single hop communication with the other terminal.

According to a characteristic of the invention, during a first encryption stage which is performed in conventional manner, after the calling subscriber has been identified by the network from a signed response provided by the individual identity card of said subscriber via the calling terminal with which said card is associated, on receiving a random number transmitted by the station to the calling terminal, a cipher key is simultaneously generated by the card associated with the calling terminal and by the network control structure for encrypting/decrypting data transmitted by radio link between said calling terminal and the station, said cipher key then being stored in a memory of the station, and said cipher key is subsequently transmitted by the station to the called terminal while setting up a radio link between said station and said called terminal for the call requested by the calling terminal, said key being for encrypting/decrypting data interchanged with said calling terminal.

The invention also provides a facility for a fixed radio station in a satellite and/or GSM/DCS type network for implementing the method of the invention.

According to a characteristic of the invention, the facility comprises means for temporarily storing the cipher key transmitted by a network control structure for data interchange between said station and a calling terminal calling via said station, and means enabling said cipher key to be sent by said station to a terminal called by the calling terminal so as to enable each of said terminals to encrypt/decrypt data transmitted by the other using a single cipher key when they are in direct communication and for the duration of said communication.

The invention also provides a facility for a mobile radio terminal of a satellite and/or GSM/DCS type network for implementing the method of the invention.

According to a characteristic of the invention, the facility comprises means enabling it to store, call by call, a cipher key received from a station of the mobile radio network when it is called, and means enabling it to use said key to encrypt/decrypt the data it interchanges while in direct communication with a terminal which has called it via said station.

BRIEF DESCRIPTION OF THE DRAWINGS

The invention, its characteristics, and its advantages, are described in greater detail below with reference to the figures listed.

FIG. 1 is a diagram showing the principle of the envisaged calling process between two terminals of a mobile radio network.

FIG. 2 is a diagram relating to the encrypting procedure in a GSM type network for a calling terminal.

FIG. 3 is a diagram showing how a cipher key is allocated to the called terminal.

MORE DETAILED DESCRIPTION

Establishing a direct encrypted radio telephone link between two terminals of a mobile radio network by satellite and/or of a GSM/DCS type implies two operations, as shown diagrammatically in FIG. 1.

In an ordinary GSM/DCS network, this assumes that the calling terminal 1 is situated within appropriate radio range of at least one network transceiver station 2 when the call is made, so as to be able to set up both-way communication over a first radio link L1 with the station under the conditions required for this purpose.

In a satellite network, it is assumed that the calling terminal is in the coverage area of the satellite system which enables it to establish a both-way link via a first radio link L1 with a network transceiver station 2 of the ground control type.

The station 2 may be of the ground control station type in a satellite mobile radio network, with this type of station being referred to herein by the acronym GSC, or of the transceiver subsystem type in a GSM/DCS mobile radio network. The subsystem is then of the type commonly referred to by the acronym BSS and it includes a control subset and at least one radio transceiver subset connected to a network that is normally a land-line network.

Depending on the network, setting up an encrypted radio telephone link that is direct or direct via a single hop as envisaged above, assumes that the called terminal 3 is either within radio range of calling station 2 or under the coverage area of the satellite at the time the call is made, so that both-way communication can also be set up by the station with said called terminal by means of a second direct or single hop radio link L2. It also assumes that both terminals are within appropriate radio range of each other or under the coverage area of the satellite system, in particular when a third radio link L3 is set up directly between them, replacing the two links set up between each of said terminals respectively and the station.

As mentioned above, the calling terminal 1 can enter into radio communication with the terminal it is calling only via the mobile radio network. Therefore, after the called number has been given to the terminal, e.g. by the user keying the number into its keypad, the terminal sends a request message to the network over a signalling channel. The message is picked up by one of the stations 2 in the mobile radio network that is within radio range of the terminal at that time.

A procedure for authenticating the calling terminal is then engaged by the network via the station 2, as mentioned above.

Providing it takes place without hitch, this procedure leads to a cipher key Kc1 being obtained for the purpose both of enciphering the data transmitted by the calling terminal 1 and of deciphering the data transmitted to it by the station 2, with this being done by an ciphering algorithm A5. This algorithm is said to be "shared" insofar as it is conventional for an identical algorithm to be provided in all of the subscriber terminals of the mobile radio network with which the calling terminal seeks to communicate. As already mentioned above, this enciphering algorithm is stored in the individual subscriber identification cards given references 0 and 0'.

After authentication, the calling terminal 1 sends the number of the terminal to be called and a call set-up stage is performed by the mobile radio network.

The station 2 performs a radio call procedure to call the terminal whose number has been supplied by the calling terminal 1.

To enable direct encrypted communication to be established between the calling terminal and the called terminal, it is necessary for the cipher key Kc to be the same in both terminals, it being assumed that both terminals have the same ciphering algorithm A5 available.

Thus, the invention has provision for allocating to the called terminal and after a first set-up stage, the cipher key Kc1 that has just been allocated to the calling terminal, however this implies that the request to set up a direct encrypted call by the calling terminal to another terminal is known to the mobile radio network, at least in the station 2 via which the request from the calling terminal is received.

In a network, which in this case is assumed to be of the GSM/DCS type, a request by a calling terminal to set up a call gives rise in general to said terminal transmitting an access request radio burst including, in particular, a service request code, which in the present case is a request to make an outgoing call. The burst is transmitted over a common access request channel. The station 2 of the mobile radio network which takes said call into account allocates a signal radio channel to the calling terminal to enable the requested call to be set up, the terminal moves onto said channel and sets up a level 2 connection by a "mobility management" level 3 message MM, which in the present case contains a service request specifying, in particular, the identity of the calling terminal, conventionally in IMSI or TMSI form, together with the type of service requested, which in this case is an outgoing call. On receiving this request, the station 2 sets up a link over a reserved signalling channel with a switching center 4 of the fixed network, conventionally known as a mobile switching center (MSC), with which it is connected by land-line, and it sends a connection request message SCCPCR containing, in particular, the above-mentioned message MM to a network control structure 5, also known as a routing subsystem NSS, forming a portion of the switching center 4. In known manner, this control structure includes, in particular, a higher level containing a central database 6 concerning general location and characteristics of subscribers, which database is commonly referred to as a home location register (HLR) and is physically located in an authentication center 7 (AUC).

Each switching center 4 has its own control substructure (not shown) via which it communicates with the higher level in the above-mentioned higher level of the control structure, and it is associated with a precise subscriber location database 8, conventionally referred to as a visitor location register (VLR) which is provided in its own control substructure.

The procedure for authenticating the calling subscriber is triggered by the network control structure 5 on receiving an MM type connection request message, and it causes an authentication response to be sent by the terminal 1 used by the subscriber in application of a procedure which is not described herein since it is conventional and is only indirectly related to the subject matter of the invention. Once the authentication procedure has succeeded, the ciphering decision is taken by the network control structure 5, conventionally in the subassembly constituted by the switching center 4 and by the location database 8. A control message for switching to encrypted mode is then sent to the station 2 with which the calling terminal is at that time in radio communication, said control message being commonly transmitted using a special interchange protocol commonly known as BSSMAP between the switching center and the station. The cipher key Kc1 for use by the calling terminal is then transmitted to the station 2 after being defined in the authentication center 7 of the network by means of the subscriber authentication key Ki as defined and stored in the calling subscriber's home location register 6 and a random number RAND that is to be supplied by the station 2 to said calling terminal for use with the current call. The cipher key Kc1, the random number RAND, and a number SRES calculated by the algorithm A3 from the two previous numbers, are transmitted in the form of a ciphering command to the control substructure located at the subset constituted by the switching center 4 and by its visitor location register 8. The cipher command is then relayed to the station 2, said command including the cipher key Kc1 and an identifier of the algorithm A5 to be used. The station 2 stores this information and then sends an order by radio to the calling terminal 1 for it to pass into encrypted mode, so that thereafter both of them communicate with each other in encrypted mode.

The above description of these authentication procedures is given by way of indication, it being understood that the procedures mentioned comply with the GSM standards.

A specific table T in the memory of the control substructure of station 2 serves to store the cipher key Kc1 which has been supplied to a calling terminal for a call that is in the process of being set up.

The calling terminal makes use of the number RAND that it has received from the station 2 during the authentication procedure in order to obtain the number SRES and the cipher key Kc1 by means of the card 0 with which it is fitted at that time. As mentioned above, the number SRES is obtained by using the authentication algorithm A3 and the subscriber authentication key Ki contained in the card, while the cipher key is determined by means of the key determination algorithm A8 likewise contained in the card 0.

A response is sent by the calling terminal 1 to the station 2 to indicate that it has switched to encrypted mode, and the station informs the control structure of the network 5 via the reserved signalling channel. This response from the calling terminal is followed by a call set-up request whereby said terminal gives the call number of the mobile radio terminal 3 with which it seeks to communicate directly. The station 2 takes cognizance of the call set-up request which it also forwards to the higher level of the control structure situated at the switching center 4 on which it is parented. The number of the called subscriber, e.g. the number given by the acronym MSISDN is both transmitted to the central home location register 6 for validity verification performed in conventional manner at said level, and is stored in the table T in the memory of the station 2 for use when setting up the direct call.

The location of the called subscriber is contained in the central database 6, thereby making it possible to define the route that needs to be established via the network for a call between the station 2 serving the calling mobile radio terminal 1 and the station serving the mobile radio terminal 3 used by the called subscriber, which station happens to be the station 2 itself in the circumstances considered herein.

The search procedure for reaching the called subscriber by radio is managed in the control substructure of the switching center 4 on which the station 2 is parented. A message containing an identity code for said called subscriber is transmitted by the station 2 over a broadcast radio channel, e.g. a channel known by the acronym PCH, and/or over a beacon path. By way of example, the identity code may be an international subscriber identifier IMSI or a temporary subscriber identifier TMSI in station 2. A radio response from the called subscriber is expected via the common access channel and coming from the terminal 3 containing the card 0' that is allocated to said subscriber, with this response triggering allocation of a signalling radio channel to said subscriber by the station 2 and the setting up of a level connection by a mobility management message in a manner analogous to that described for the calling terminal 1 during the same stage of the call set-up procedure. Afterwards there is an authentication stage which is analogous to that described above for the calling terminal. A decision to encrypt the call set up between the terminal 3 and the station 2 is taken at the higher level of the network control structure 5 which sends a command to cause the call to pass into encrypted mode, which command is sent to the station 2 via the control substructure situated in the subset constituted by the switching center 4 and by its visitor location register 8. As before, these procedures are mentioned by way of indication, since they are in compliance with GSM standards.

A cipher key Kc2, a random number RAND', and a number SRES' calculated using the ciphering algorithm A3 are then transmitted in the form of a triplet to the control substructure of the switching center 4 with which the station 2 is associated. The station receives a ciphering command including the key Kc2 and the number RAND', and it transmits RAND' to the called terminal 3 which deduces the cipher key Kc2 therefrom. A response is then sent by the called terminal 3 to the station 2 to indicate that it has switched to encrypted mode, and the station informs the network control structure 5. In accordance with GSM standards, the use of this cipher key Kc2 makes it possible to encrypt the subsequent portions of the set-up stage between the called terminal and the station 2, and in particular to encrypt the message which transmits the cipher key Kc1 to the called terminal.

The station 2 then receives a message requesting call set up with the called terminal which is sent thereto by the control structure via the substructure situated in the switching center 4.

The station 2 detects a request to set up direct communication between a calling terminal 1 and a called terminal 3 both of which are connected thereto by radio, and it then sends the cipher key Kc1 that was allocated to the calling terminal 1 to the called terminal, which key is stored in table T in the station. The cipher key Kc1 is transmitted, for example, in the call set-up message that station 2 conventionally transmits to the called terminal so as to continue the set-up procedure until it has been completed, i.e. until the called terminal has responded by answering the call or "going off-hook" after it has received a call signal corresponding to ringing in conventional telephony.

In a variant embodiment, a special message is transmitted by the station 2 to the called terminal to send the cipher key Kc1 thereto after the call set-up message which is then constituted in conventional manner, with this serving the purpose of keeping the procedures separate.

In either case, the called terminal indicates that it has taken the special message it has received into account, and the station 2 and both of the terminals concerned then make use solely of cipher key Kc1 for all enciphering and deciphering operations that they perform while communicating with one another.

What is claimed is:

1. A method of enabling encrypted communication to take place directly in a single hop or merely directly between two terminals of a mobile radio network by satellite and/or of a GSM/DCS type after a call has been set up by one of them via a fixed radio station of the network, wherein during a first encryption stage, after a calling subscriber has been identified by the network from a signed response provided by an individual identity card of said subscriber via the calling terminal with which said card is associated, on receiving a random number transmitted by the station to the calling terminal, a cipher key is simultaneously generated by the card associated with the calling terminal and by the network control structure for encrypting/decrypting data transmitted by radio link between said calling terminal and the station, said cipher key then being stored in a memory of the station, and wherein said cipher key is subsequently transmitted by the station to the called terminal while setting up a radio link between said station and said called terminal for the call requested by the calling terminal, said key being for encrypting/decrypting data interchanged with said calling terminal.

2. A method according to claim 1, wherein the cipher key is included in the call set-up message that the station transmits to the called terminal while setting up a radio link with said called terminal.

3. A method according to claim 1, wherein the cipher key is transmitted in a special message transmitted by the station separately from the call set-up message which said station transmits to the called terminal, while setting up a radio link with said called terminal.

4. A facility for a fixed radio station of a satellite and/or GSM/DCS type network for implementing the method according to claim 1, the facility comprising means for temporarily storing the cipher key transmitted by a network control structure for data interchange between said station and a calling terminal calling via said station, and means enabling said cipher key to be sent by said station to a terminal called by the calling terminal so as to enable each of said terminals to encrypt/decrypt data transmitted by the other using a single cipher key when they are in direct communication and for the duration of said communication.

5. A facility for a mobile radio terminal of a satellite and/or GSM/DCS type network for implementing the method according to claim 1, the facility comprising means enabling it to store, call by call, a cipher key received from a station of the mobile radio network when it is called, and means enabling it to use said key to encrypt/decrypt the data it interchanges while in direct communication with a terminal which has called it via said station.

6. A method of enabling encrypted communication between a calling terminal and a called terminal of a mobile radio network, after a call has been set up via a fixed radio station of the network, comprising the steps of:

identifying a calling subscriber from a signed response provided to the network by the calling terminal with which said subscriber is associated;

transmitting a random number from the station to the calling terminal;

generating a cipher key, using the random number, simultaneously by the calling terminal and by a network control structure of said mobile radio network;

storing said cipher key in a memory of the station;

encrypting/decrypting, with said cipher key, data transmitted between said calling terminal and the station;

transmitting the cipher key from the station to the called terminal; and encrypting/decrypting, with the cipher key, data interchanged between said calling terminal and said called terminal.

7. A method according to claim 6, wherein the cipher key is transmitted to the called terminal in a call set-up message that the station transmits to the called terminal while setting up a radio link with said called terminal.

8. A method according to claim 6, wherein the cipher key is transmitted to the called terminal in a special message transmitted by the station separately from a call set-up message, wherein said call set-up message is transmitted by said station to the called terminal while setting up a radio link with said called terminal.

9. A facility for a fixed radio station of a mobile radio network implementing the method according to claim 6, the facility comprising:

storage in which the cipher key received from the network control structure is stored; and a radio transceiver which transmits the cipher key from said facility to the called terminal.

10. A facility for a mobile radio terminal implementing the method according to claim 6, the facility comprising:

a radio transceiver which receives the cipher key from a station of the mobile radio network;

storage in which the cipher key is stored, call-by-call; and means enabling use of the key to encrypt/decrypt data interchanged while in direct communication with the calling terminal which established direct communication via said station.

* * * * *